United States Patent

[11] 3,630,130

| [72] | Inventor | Irving Erlichman<br>Wayland, Mass. |
|---|---|---|
| [21] | Appl. No. | 809,143 |
| [22] | Filed | Mar. 21, 1969 |
| [45] | Patented | Dec. 28, 1971 |
| [73] | Assignee | Polaroid Corporation<br>Cambridge, Mass.<br>Continuation of application Ser. No.<br>663,719, Aug. 28, 1967, now abandoned.<br>This application Mar. 21, 1969, Ser. No.<br>809,143 |

[54] FOLDING CAMERA
29 Claims, 7 Drawing Figs.

| [52] | U.S. Cl. | 95/11, 95/39 |
|---|---|---|
| [51] | Int. Cl. | G03b 19/10 |
| [50] | Field of Search | 95/13, 39, 11 |

[56] References Cited
UNITED STATES PATENTS

| 711,891 | 10/1902 | Butler | 95/39 X |
|---|---|---|---|
| 1,184,110 | 5/1916 | Linder | 95/39 |
| 2,880,658 | 4/1959 | Land | 95/13 |

*Primary Examiner*—John M. Horan
*Attorneys*—Brown and Mikulka and Robert E. Corb ABSTRACT: A camera is disclosed comprising a housing including four sections joined for pivotal movement about parallel axes between operative and folded positions, a lens and shutter enclosed in one housing section, a mirror in a second housing section, a focal plane plate for locating a recording medium for exposure in a third housing section and an opaque elastic envelope coupled between the three housing sections providing a lighttight chamber through which light is transmitted from the lens via the mirror to the recording medium.

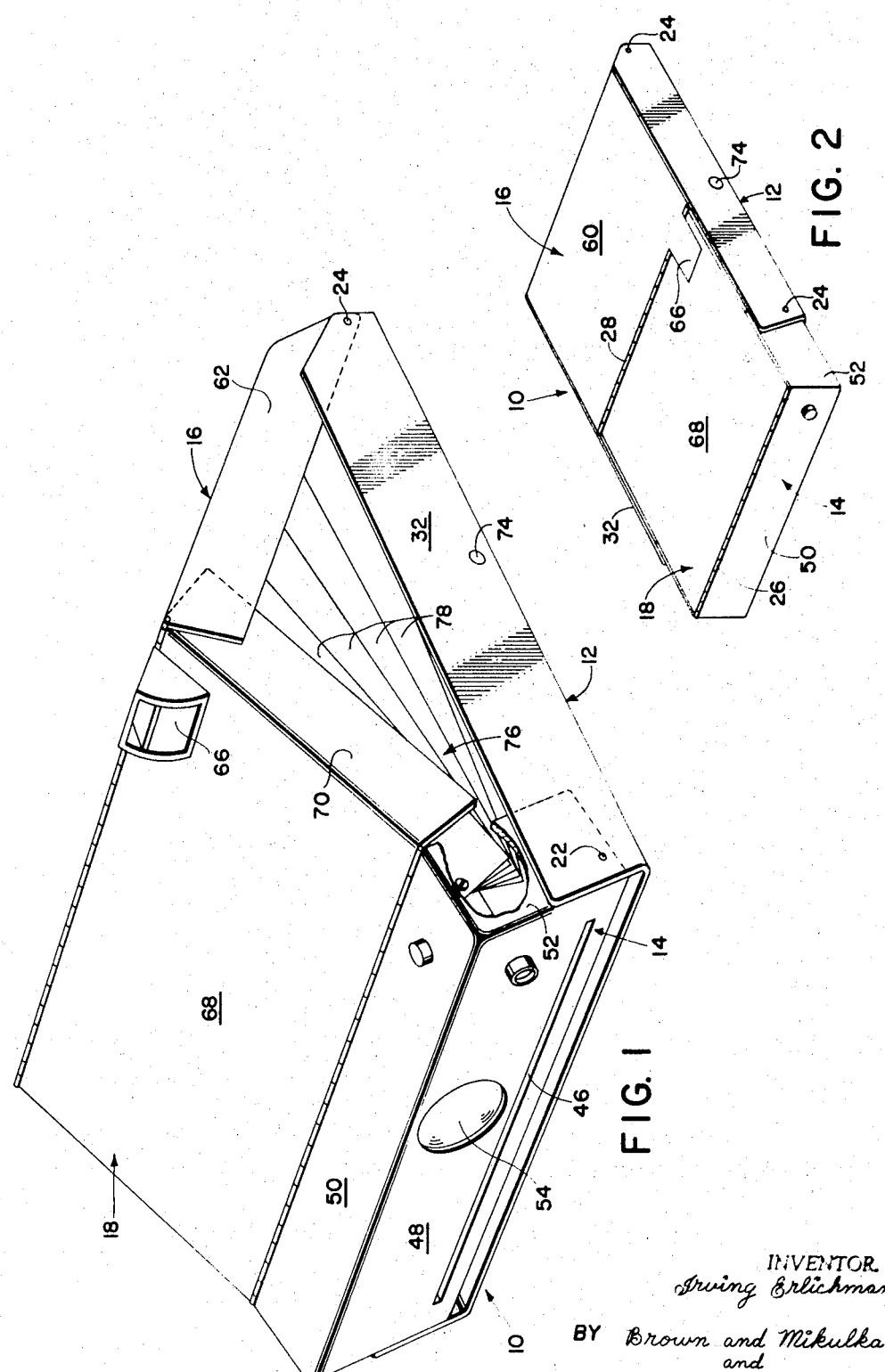

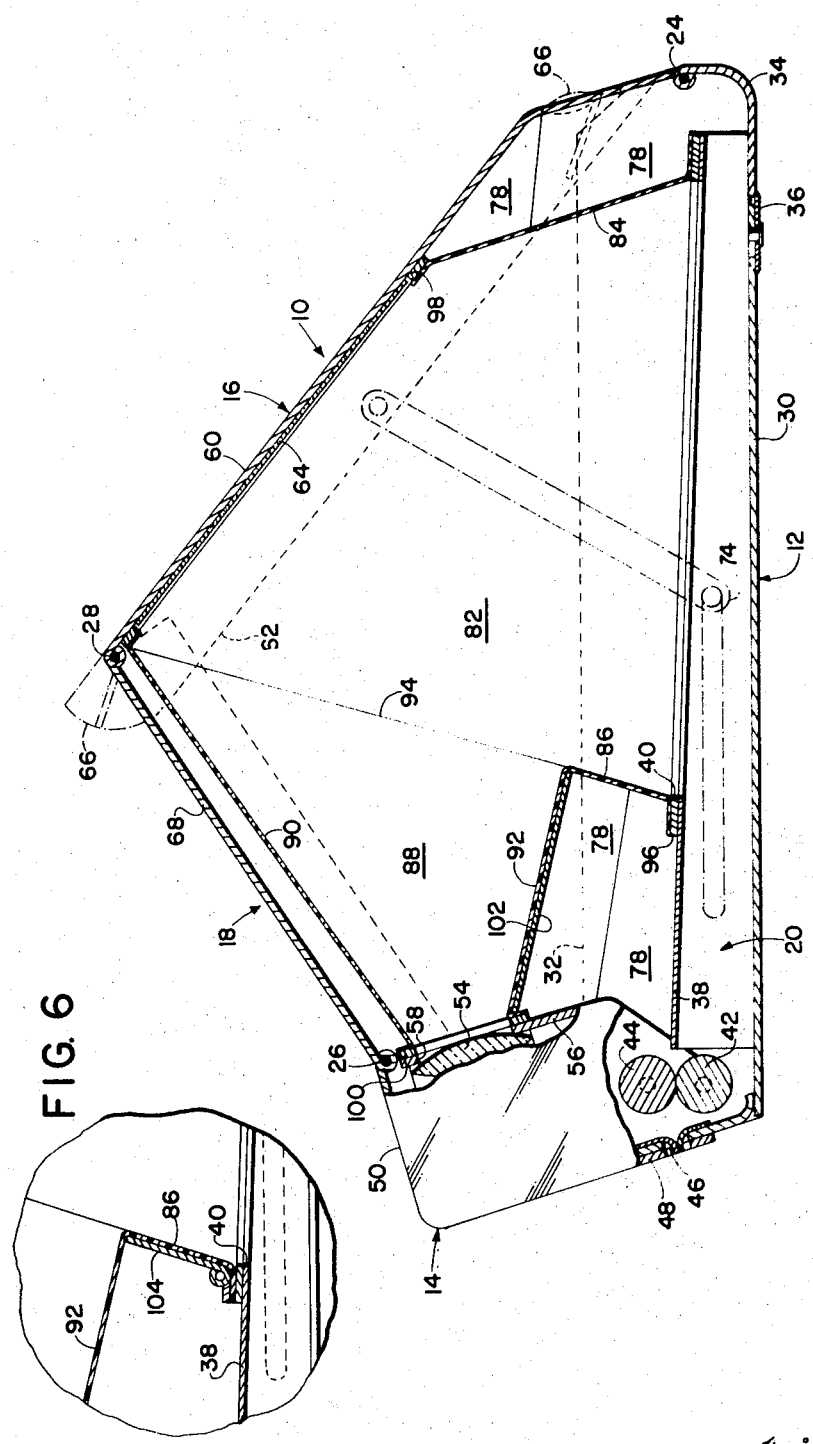

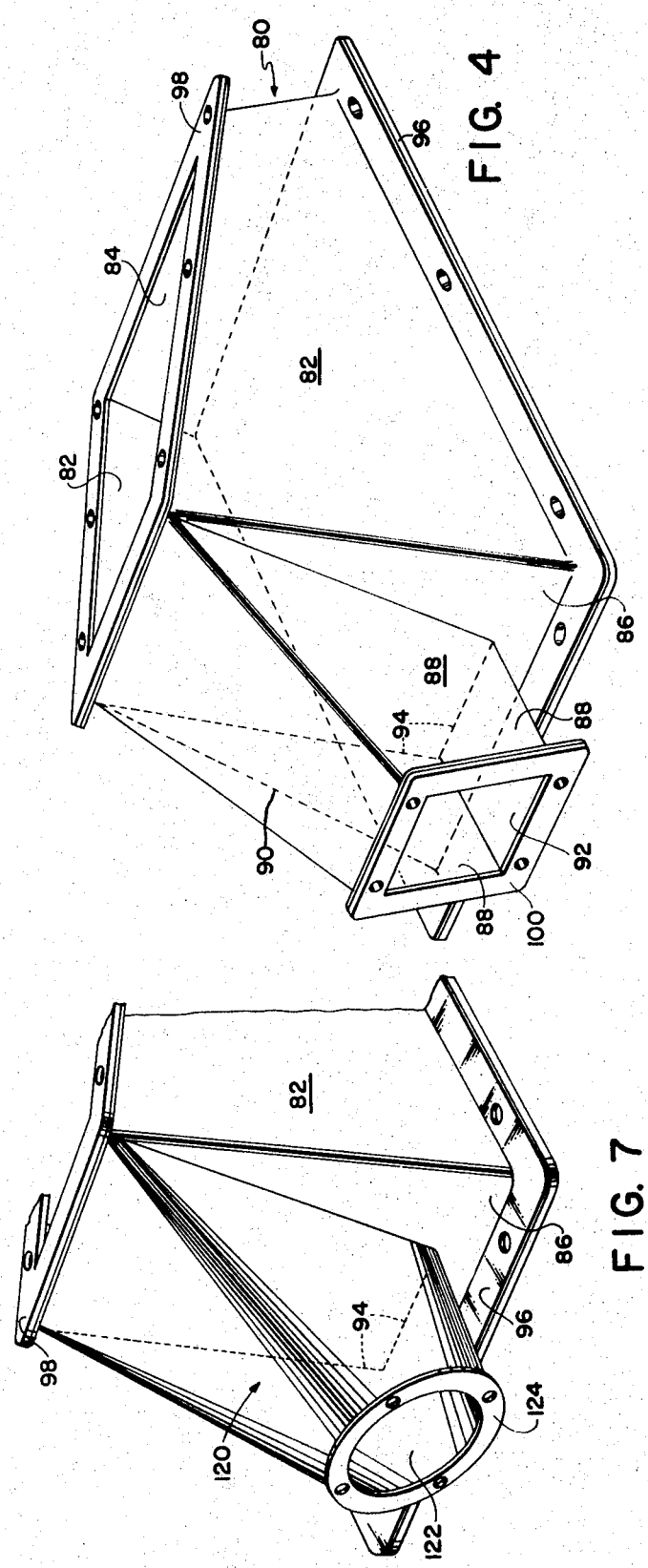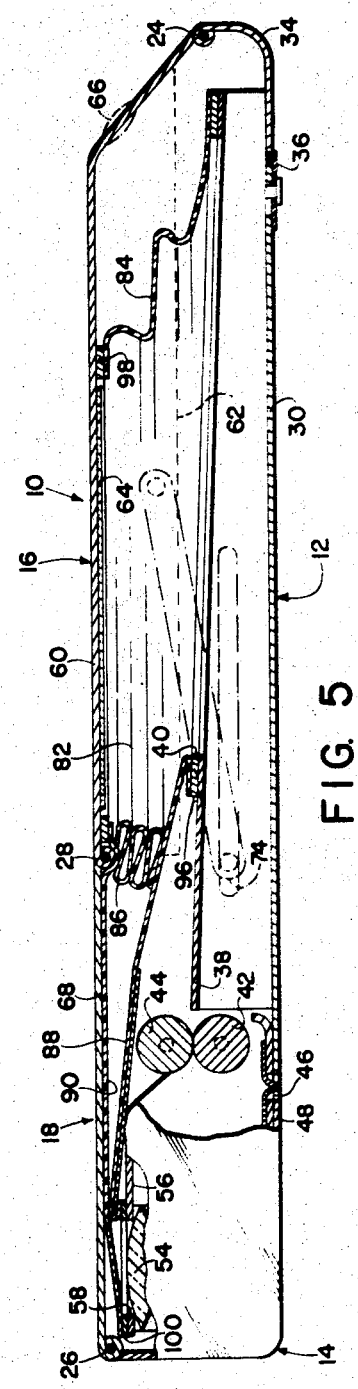

FOLDING CAMERA

This application is a continuation-in-part of application Ser. No. 663,719, filed Aug. 28, 1967 now abandoned, in the name of Irving Erlichman.

The present invention is concerned with the structure of a compact, folding, self-developing camera of the type shown and described in the copending U.S. Pat. applications of Edwin H. Land, Ser. No. 655,850, filed July 25, 1967, and Irving Erlichman, Ser. No. 655,859, filed July 25, 1967. These applications describe a camera having four rigid housing sections coupled to one another at their ends for pivotal movement about parallel axes. Exposure means, such as a conventional lens and shutter, are mounted in a first of the housing sections, a mirror is mounted in a second of the housing sections and means, such as a conventional focal plane plate, are provided in a third housing section for locating a photosensitive image-recording medium in position for exposure to light transmitted by the lens and reflected by the mirror. The first and second housing sections are pivotally coupled to opposite ends of the third housing section and the fourth housing section joins the first and second housing sections which are pivotable between an operative or extended position in which the housing sections are spaced apart from one another to provide a light path from the lens via the mirror to the recording medium, and a folded or collapsed position in which the first and third housing sections are disposed more or less end to end with respect to one another and the second and fourth housing sections are located in facing relation to the first and third housing sections to provide a very compact structure.

The aforementioned Erlichman application describes a camera structure of this type including a pair of fan-type bellows located between the housing sections at the sides thereof and cooperating with the housing sections to provide the lighttight chamber through which light is transmitted from the lens via the mirror to the recording medium. Each of these bellows comprises several interlocking elements joined to one another so as to provide a lighttight structure.

Objects of the present invention are to provide a folding camera of the type described including novel and improved means for coupling the housing sections to prevent admission of ambient light into the camera while providing for a more compact and less expensive structure; to provide means of the type described in the form of an elastic envelope that is compact, simple and easily fabricated and assembled; and to provide a camera structure as described in which the elastic envelope providing a lighttight exposure chamber is protected against physical injury.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects so the invention, reference should be had to the following detailed description taken in connection with the accompanying drawings wherein:

FIG. 1 is a perspective view of a camera embodying the invention shown in an operative position;

FIG. 2 is a perspective view of the camera of FIG. 1 shown in a folded position;

FIG. 3 is a sectional view of the camera of FIG. 1, the section being taken substantially midway between the sides of the camera;

FIG. 4 is a perspective view of a component of the camera of FIG. 1;

FIG. 5 is a view similar to FIG. 3 with the camera shown in a folded position;

FIG. 6 is fragmentary sectional view of a portion of the camera illustrating another embodiment of the invention; and FIG. 7 is a fragmentary, perspective view, similar to FIG. 4, of another embodiment of a component of the camera.

Reference is now made to FIGS. 1 through 3 and 5 of the drawings wherein there is shown a camera, generally designated 10, comprising a housing including a first or rear section 12, a second housing section 14, a third section 16, and a forth section 18. The first housing section 12 may be characterized as the rear housing section and is adapted to hold a film pack 20 or assemblage of film units comprising a plurality of film units adapted to be exposed within the film pack and advanced through the camera. The first housing section is pivotally connected near one end to second housing section 14 at pivots 22 and at its opposite end to third housing section 16 at a hinge 24. Housing sections 14 and 16 are coupled to fourth housing section 18 at, respectively, hinges 26 and 28 having axes arranged in generally parallel relation with the axis of pivots 22 and hinge 24. The housing sections cooperate to form, in effect a four-bar linkage which is movable between an operative or extended position shown in FIGS. 1 and 3 in which the housing sections are spaced apart to provide four sides of a chamber and a folded or transport position shown in FIGS. 2 and 5 in which the first and second hosing sections are located end to end substantially in a line and the third and fourth housing sections are located in line with one another and in face-to-face adjacency with the first and second housing sections.

First housing section 12 comprises a generally rectangular rear wall 30, dependent sidewalls 32 and a door 34, pivoted about hinge 24, and adapted to be retained in a closed position by a latch 36 and to be opened to permit loading of a film pack 20 into the camera housing.

The camera is adapted to be employed with a film pack 20 of the type shown and described in greater detail in the aforementioned Land application and incorporating a plurality of film units of the type shown and described in the U.S. Pat. application of Edwin H. Land, Ser. No. 622,287, and Edwin H. Land et al. Ser. No. 622,286, both filed Mar. 10, 1967. Film pack 20 includes a plurality of film units arranged in stacked relation with the film unit closest the forward wall of the pack located in position for exposure and each film unit is adapted, following exposure, to be withdrawn from the film pack and processed to form a visible image by a processing mechanism incorporated in the camera. To position the film pack and the film units therein for exposure, the first housing section includes an inner wall or focal plane plate 38 spaced from rear wall 30 in position to locate the forwardmost film unit for exposure and including a rectangular exposure aperture 40 through which light may be transmitted for exposing the forwardmost film unit in the film pack.

Since film pack 20 is tapered, as shown, toward its trailing end, inner wall 38 may be mounted for pivotal movement away from rear wall 30 in the manner described in the aforementioned Land application in order to facilitate loading of a film pack into the camera when door 34 is opened for this purpose.

The processing system of the camera includes a pair of pressure-applying rollers 42 and 44 mounted in juxtaposition near the leading end of the film pack and means, described in detail in the aforementioned application Ser. No. 655,850, for feeding the exposed film units into the bite of the rollers and rotating the rollers to distribute a processing liquid within the exposed film unit while advancing the latter from the film pack between the rollers and from the camera. Rollers 42 and 44 may be mounted in either the first or second housing sections or, as shown in FIG. 3, roller 42 is mounted in both with the axis of pivots 22 being coincident with the axis of roller 42. An opening 46 is provided in the second housing section to permit advancement of a film unit, during processing, between rollers 42 and 44 from the camera housing.

Second housing section 14 is generally parallelepiped shaped is engaged between sidewalls 32 of the first housing section and is pivotable with respect to the first housing section about the axis of roller 42. The second housing section includes outer wall 48 which, in the folded position of the camera housing, is located in essentially the same plane as rear wall 30, and in the extended or operative position of the camera housing, functions as the forward wall of the camera. Suitable openings are provided to admit light into the camera lens, and the second housing section includes an outer wall 50 which, in the folded position of the camera, constitutes an end wall of the camera and in the extended position of the camera functions as one of the upper walls of the camera housing; and sidewalls 52 engaged between sidewalls 32 of the rear housing section. A conventional photographic objective lens designated 54 is mounted within the second housing section with the lens axis disposed perpendicularly to the outer or forward wall 48 such that light transmitted through the lens along the axis is directed, in the operative position of the camera housing, away from and at an acute angle with respect to the focal plane plate; and in the folded position of the camera housing, the axis of lens 54 extends approximately perpendicularly to the focal plane plate. The second housing section also includes an inner or rear wall 56 disposed in generally parallel relation with outer wall 48 and provided with an aperture 58 for transmitting light from lens 54.

Third housing section 16 comprises an outer wall 60 pivotally connected at one end via hinge 24 to rear housing section 12, and dependent sidewalls 62 engaged between sidewalls 32 of the rear housing section. A substantially planar and preferably front surface mirror 64 is mounted on the inside of wall 60 for deflecting light from lens 54 toward a film unit positioned for exposure behind aperture 40 in focal plane plate 48. The angle at which the axis of lens 54 intersects mirror 64 in the operative position of the camera housing is preferably greater than 45° in order to provide for a more compact camera structure and mirror 64 is trapezoidal in shape with the end of the mirror closest hinge 28 and lens 54 being narrower than the opposite end of the mirror.

A conventional view finder, generally designated 66, may be mounted within third housing section adjacent one side of mirror 64 and includes entrance and exit apertures provided with mirrors at opposite ends of the third housing section.

Fourth housing section 18 comprises an outer wall 68 pivotally connected at one end at hinge 28 to outer wall 60 of third housing section 16 and along its opposite end at hinge 26 to the second housing section 14, and dependent sidewalls 70 engaged between sidewalls 62 of third housing section 16 and outside of the ends of second housing section 14 so that in the folded position of the camera housing, the third and fourth housing sections are located between sidewalls 32 of the first housing section and the sidewalls of the fourth housing section are located between the sidewalls of the third housing section. The fourth housing section functions essentially as a connection or a link between the second and third housing sections, and means including a rigid link 72 pivoted at one end on third housing section 16 and engaged for pivoting and sliding movement at its opposite end on first housing section 12, are provided for retaining the camera housing in the operative or erect position shown in FIG. 3. These erecting means, described in greater detail in the aforementioned Erlichman application, include a manually operable button 74 and a detent (not shown) on the first housing section for retaining link 72 against movement and hereby secure the housing sections in an erect position.

A fanlike bellows generally designated 76 including a plurality of blades 78 pivoted about a single axis on second housing section 14 and covered at their ends and along the sides of the two outermost blades by sidewalls 32, 62 and 70 are provided on opposite sides of the camera housing to form a protective outer housing for the camera. Blades 78 may be planar or slightly curved to give them rigidity but otherwise comprise a very simple construction inasmuch as the bellows or housing walls provided by the blades are not required to be lighttight and merely function to provide collapsible outer walls for the camera housing.

In accordance with the invention, the camera includes a very simple and inexpensive means for light sealing the camera housing to provide a lighttight optical path between the lens mirror and focal plane plate. This means contributes to the overall simplicity and low cost of the camera structure because it makes it unnecessary to take special precautions with the components of the camera housing including the hinges, bellows and viewfinder, to render these components lighttight. In the form shown in FIGS. 3 through 5 of the drawings, these means comprise an envelope 80 formed of a thin opaque elastomeric material such as rubber neoprene, silicone rubber and the like. Elastomers useful for this purpose are well known in the art and lend themselves to formation by well known mass production methods. The walls of the envelope are relatively thin, e.g., having thicknesses of the order of 0.005 to 0.020 inch and may be rendered opaque for example, by filling the material with lamp black or a similar light-absorbent substance. Preferred materials for envelope 80 include elastomers having certain properties including capability of being stretched by a factor of three, resistance to taking a permanent set and ability to undergo a large number of stretching and folding cycles without cracking or developing voids through which light might be admitted.

Envelope 80 includes a main body section comprising sidewalls 82 and end walls 84 and 86 joined to one another to form a pyramid or tapered tube including openings at opposite ends; and an extended section including sidewalls 88, a forward wall 90, and a rear wall 92 joined to one another to form another tapered tube open at one end and joined at its other end to end wall 86 at an opening 94 therein. Envelope 80, in the extended position shown in FIG. 4, thus provides a chamber or container including a tapered main section open at opposite ends and a tapered secondary section joined to one side of the main section and open at its end. Rigid frames 96, 98, and 100 are provided at the openings in envelope 80 with walls 82, 84, and 86 being secured in a lighttight manner along their edges to frame 96 and along their opposite edges to frame 98, and walls 88, 90, and 92 being secured at their edges to frame 100. Frames 96 and 100 may be rectangular in shape with the opening in frame 96 corresponding in size and shape to exposure aperture 40 in focal plane plate 38 and the opening in frame 100 being sufficiently large so as not to vignett or block lens 54. Frame 98 is preferably trapezoidal in shape and includes an opening corresponding to mirror 64. Frames 96, 98, and 100 provide means for securing envelope 80 in a lighttight manner to, respectively, focal plane plate 38 around aperture 40, rear wall 60 around mirror 64 and inner wall 56 around aperture 58 to provide a lighttight chamber through which light may be transmitted from lens 54 to mirror 64 and thence through aperture 40 to an image-recording medium located behind the aperture.

The dimensions of the walls of envelope 80 are such that the walls are in a stressed condition and assume generally planar configurations when the camera housing is in an operative or extended condition; and most of the walls are in a substantially relaxed condition when the camera is in a folded condition. The flexibility, elasticity, and thickness of the material comprising the envelope permits the camera to be folded and unfolded repeatedly and requires very little space for the envelope when the camera is folded thereby further contributing to the compactness of the camera structure while insuring lighttightness where required.

Rear wall 92 and end wall 86 of envelope 80 are joined at a line or corner with the rear wall functioning as a baffle for preventing exposure of the photosensitive medium by off-axis light transmitted by the lens, so that the location of the juncture of the two walls is important in order to prevent unwanted exposure of the recording medium. Means are provided for insuring proper location of rear wall 92 and the intersection thereof with wall 86 in the extended position of a camera housing and in the form shown in FIGS. 3 through 5, these means comprise a stiffening element 102 secured to rear wall 96 in position to be engaged at opposite edges between frame 100 and end wall 86 in the extended position of the camera. Stiffening element 102 may be formed of a relatively rigid material such as sheet metal or an organic plastic and may be attached at its medial portion to rear wall 92 of envelope 80 so as to permit wall 92 to stretch as required when the camera housing is folded and unfolded.

In an alternative embodiment shown in FIG. 6, a stiffening element 104 is pivotally mounted on focal plane plate 38 so as to extend adjacent end wall 86 of the envelope to the juncture of the latter and rear wall 92 and thereby properly and accurately locate the latter and the juncture in the extended position of the camera housing. Stiffening element 104 is hinged to enable it to be pivoted rearwardly in a counterclockwise direction when the camera is folded so that the stiffening element will lie adjacent the forward wall of the film pack. A spring (not shown) may be provided for biasing stiffening element 104 in a clockwise direction into the operative position shown in FIG. 6 or in the alternative, the stiffening element may be attached to end wall 86 of envelope 80.

Reference is now made to FIG. 7 of the drawings wherein there is illustrated an embodiment of envelope 80, similar in most respects to the embodiment shown in FIG. 4, but differing therefrom in the configuration of the extended section 120 which extends between end wall 86 of the main body section and to rear wall 56 of the second housing section. The lens opening in rear wall 56 is circular and extended section 120 of the envelope includes a correspondingly circular opening 122 surrounded by a relatively circular rigid means adapted to be secured to rear wall 56 in surrounding relation to the lens opening therein. This relatively rigid attachment means may take the form of a flange designated 124 or other means for facilitating a secure lighttight coupling between extended section 120 and the rear wall of the second housing section. Extended section 120 tapers from a generally trapazoidal-shaped configuration where it joins end wall 86 at the border of opening 94 therein to a generally conical configuration at opening 122.

It will be appreciated from the foregoing that the elastomeric envelope embodying the invention provides for a more compact, yet lighttight, camera structure with a relatively simple and inexpensive construction that lends itself to mass production methods, is easily assembled in the camera, and functions reliably and well.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An envelope for light-sealing photographic apparatus comprising, in combination:
    a first section formed of a flexible, opaque sheet material in the form of a generally frustropyramidal tube having rectangular openings at opposite ends and in a wall thereof;
    second section formed of said sheet material in the form of a tapered tube having an opening at one end and joined at its other end to said wall of said first section surrounding said rectangular opening therein; and
    attachment means secured to said sections around said openings at said ends thereof for attaching said envelope to photographic apparatus at said openings.

2. An envelope as defined in claim 1 wherein said sheet material is an elastomer.

3. An envelope as defined in claim 1 wherein said first section includes four substantially planar walls.

4. An envelope as defined in claim 1 wherein said opening at said end of said second section is circular.

5. An envelope as defined in claim 1 wherein said second section includes four substantially planar walls and said opening therein is rectangular.

6. A camera comprising, in combination:
    a housing including a plurality of sections movable with respect to one another between operative and folded positions;
    exposure means located in one of said housing sections;
    means within another of said sections for positioning a photosensitive recording medium for exposure;
    an envelope having thin walls formed of a flexible, light-opaque material and including at least two openings;
    first attachment means for securing said envelope in a lighttight manner to an internal portion of said one housing section in the region surrounding one of said openings for admitting light from said exposure means to the interior of said envelope through said one opening;
    second attachment means for coupling said envelope in a lighttight manner to an internal portion of said other housing section in the region surrounding the other of said openings for transmitting light to a recording medium positioned for exposure within said other housing section;
    said walls of said envelope being under stress in said operative position of said camera housing to provide a lighttight chamber of predetermined shape and dimensions extending between said housing sections for transmitting light from said exposure means to a photosensitive recording medium while preventing exposure of the latter by ambient light; and
    means for preventing the direct passage of light from said one opening through said other opening when said envelope is in said operative position.

7. A camera as defined in claim 6 wherein said envelope is formed of an elastomer.

8. A camera as defined in claim 6 wherein said envelope includes a portion having walls attached to said other housing section along substantially straight lines and, in said operative position, being so stressed as to assume generally planar configurations.

9. A camera as defined in claim 6 wherein said envelope includes walls so dimensioned as to be substantially relaxed when said camera housing sections are in said folded position.

10. A camera as defined in claim 9 wherein said envelope includes other walls so dimensioned as to be under stress when said camera housing sections are in said folded position.

11. A camera as defined in claim 6 wherein said attachment means include relatively rigid members secured in a lighttight manner to the walls of said envelope surrounding said openings.

12. A camera as defined in claim 6 including collapsible housing sections joining the first-mentioned housing sections and located externally of said envelope providing a protective cover therefor.

13. A camera as defined in claim 6 wherein said housing sections are coupled for pivotal movement with respect to one another.

14. A camera comprising, in combination:
    a housing including a plurality of sections movable with respect to one another between operative and folded positions;
    exposure means located in one of said housing sections;
    means within another of said sections for positioning a photosensitive recording medium for exposure;
    an envelope having thin walls formed of a flexible, light-opaque material and including at least two openings;
    first attachment means for securing said envelope in a lighttight manner to an internal portion of said one housing section in the region surrounding one of said openings for admitting light from said exposure means to the interior of said envelope through said one opening;
    said attachment means for coupling said envelope in a lighttight manner to an internal portion of said other housing section in the region surrounding the other of said openings for transmitting light to a recording medium positioned for exposure within said other housing section;
    said walls of said envelope being under stress in said operative position of said camera housing to provide a lighttight chamber of predetermined shape and dimensions extending between said housing sections for transmitting light from said exposure means to a photosensitive recording medium while preventing exposure of the latter by ambient light;

a third housing section movably coupled to said other housing section;

optical means within said third housing section for directing light from said exposure means toward a recording medium positioned for exposure in said other housing section;

said envelope including a third opening; and third attachment means for coupling said envelope in a lighttight manner to an internal portion of said third housing section for allowing the passage of light to and from said optical means through said third opening in said envelope.

15. A camera as defined in claim 14 wherein said envelope is formed of an elastomer.

16. A camera as defined in claim 14 wherein said envelope includes first and second tapered sections, said first tapered section being attached at its base to said other housing section and at its opposite end to said third housing section, said second tapered section being joined at its base to a wall of said first tapered section and attached at its opposite end to said one housing section.

17. A camera as defined in claim 16 wherein said envelope is formed of an elastomer.

18. A camera as defined in claim 14 wherein said housing sections are coupled for pivotal movement with respect to one another about substantially parallel axes.

19. A camera as defined in claim 18 including a fourth housing section coupled with said one and said third housing sections.

20. A camera as defined in claim 18 wherein said envelope includes a first portion having walls extending between said other housing section and said third housing section and a second portion including walls extending between one of said walls of said first portion and said one housing section.

21. A camera as defined in claim 20 wherein one of said walls of said second portion of said envelope joins said one wall of said first portion of said envelope at an intermediate section thereof and means are provided for predeterminedly locating the intersection of the last-mentioned walls when said camera housing sections are in said operative position.

22. A camera comprising, in combination:

a housing including a plurality of sections movable with respect to one another between operative and folded positions;

exposure means including a lens mounted in one of said housing sections, said one housing section including an inner wall having an aperture for said lens;

means within another of said sections for positioning a photosensitive recording medium for exposure; an envelope having thin walls formed of a flexible, light-opaque material and including at least two openings;

first attachment means including a relatively rigid member secured to said inner wall around said aperture in a lighttight manner in the region surrounding one of said openings for admitting light from said exposure means to the interior of said envelope through said one opening; and second attachment means including a relatively rigid member for coupling said envelope in a lighttight manner to an internal portion of said other housing section in the region surrounding the other of said openings for transmitting light to a recording medium positioned for exposure within said other housing section;

said walls of said envelope being under stress in said operative position of said camera housing to provide a lighttight chamber of predetermined shape and dimensions extending between said housing sections for transmitting light from said exposure means to a photosensitive recording medium while preventing exposure of the latter by ambient light.

23. A camera comprising, in combination:

a housing including a plurality of sections movable with respect to one another between operative and folded positions;

exposure means located in one of said housing sections;

means within another of said sections for positioning a photosensitive recording medium for exposure; an envelope having thin walls formed of a flexible, light-opaque material and including at least two openings;

first attachment means including a relatively rigid member for securing said envelope in a lighttight manner to an internal portion of said one housing section in the region surrounding one of said openings for admitting light from said exposure means to the interior of said envelope through said one opening;

second attachment means including a relatively rigid member for coupling said envelope in a lighttight manner to an internal portion of said other housing section in the region surrounding the other of said openings for transmitting light to a recording medium positioned for exposure within said other housing section;

said walls of said envelope being under stress in said operative position of said camera housing to provide a lighttight chamber of predetermined shape and dimensions extending between said housing sections for transmitting light from said exposure means to a photosensitive recording medium while preventing exposure of the latter by ambient light; and said means for positioning said photosensitive recording medium for exposure further includes an inner wall having an aperture for transmitting light to a recording medium located behind said aperture and said second attachment means are secured to said inner wall around said aperture.

24. A flexible envelope for light-sealing photographic apparatus having a first housing including means for supporting a photosensitive medium in position for exposure, a second housing including exposure means, and a third housing including optical means for receiving light from the exposure means and redirecting the light toward the photosensitive medium, said envelope comprising:

a first section having an opening therein;

first means for attaching said first section to the first housing with said opening in alignment with the means for supporting a photosensitive medium in position for exposure;

a second section having an opening therein;

second means for attaching said second section to the second housing with said opening in said second section in alignment with the exposure means;

a third section having an opening therein; and third means for attaching said third section to the third housing with said opening in said third section in alignment with the optical means.

25. A flexible envelope as defined in claim 24 further including means for preventing the direct passage of light from said opening in said second section through said opening in said first section when said envelope is in an extended position.

26. A camera comprising, in combination:

a housing including a plurality of sections movable with respect to one another between operative and collapsed positions;

exposure means located in one of said housing sections;

means within another of said sections for positioning a photosensitive recording medium for exposure;

an envelope having thin walls formed of a flexible, light-opaque material and including at least two openings located in obtusely disposed planes when said sections are in said operative position;

first means for attaching said envelope in a lighttight manner to an internal portion of said one housing section in the region surrounding one of said openings for directing light from said exposure means to the interior of said envelope through said one opening in a direction generally away from the other opening in said envelope;

second means for attaching said envelope in a lighttight manner to an internal portion of said other housing section in the region surrounding said other opening for transmitting light to a recording medium positioned for exposure within said other housing section; and reflecting means for redirecting light admitted into said envelope by said exposure means and said one opening toward said other opening and the photosensitive recording medium.

27. A camera as defined in claim 26 wherein means are provided for preventing the direct passage of light from said one opening through said other opening when said envelope is in an extended position.

28. A camera as defined in claim 27 wherein said means for preventing the direct passage of light includes a wall of said envelope.

29. A flexible envelope having thin walls formed of a flexible, light-opaque material for light sealing photographic apparatus of the collapsible type, said envelope including:

means defining a first opening for transmitting light to a photosensitive recording medium positioned for exposure within the photographic apparatus;

means defining a second opening for transmitting light into the interior of said envelope, said first and second openings being substantially located in obtusely disposed planes when said envelope is in an extended position; and means defining a third opening, said third opening being substantially located in a plane acutely disposed relative to said plane containing said first opening when said envelope is in an extended position, said third opening being adapted to cooperate with optical means for allowing light admitted by said second opening to impinge the optical means.

* * * * *

UNITED STATES PATENT OFFICE
CERTIFICATE OF CORRECTION

Patent No. 3,630,130            Dated December 28, 1971

Inventor(s) Irving Erlichman

It is certified that error appears in the above-identified patent and that said Letters Patent are hereby corrected as shown below:

In the Abstract, line 4, "a second" should be --another--; and line 6, "a third" should be --still another--.

Column 1, line 9, after "1967" insert --and now abandoned--;

line 10, after "1967" insert --now U. S. Patent No. 3,479,941--;

line 14, "first" should be --second--;

line 15, "second" should be --third--;

line 17, "third" should be --first--;

line 19, "first and second" should be --second and third--;

line 21, "third" should be --first--;

line 22, "first and second" should be --second and third--;

line 27, "third" should be --second--;

line 28, "second" should be --third--;

line 30, "third" should be --second--; and line 57, "so" should be --of--.

UNITED STATES PATENT OFFICE
CERTIFICATE OF CORRECTION

Patent No. 3,630,130          Dated December 28, 1971

Inventor(s) Irving Erlichman

It is certified that error appears in the above-identified patent and that said Letters Patent are hereby corrected as shown below:

Column 2, line 21, "hosing" should be --housing--; and line 36, after "1967" insert --the latter application now abandoned--.

Column 3, line 27, "deflecting" should be --reflecting--.

Column 4, line 17, after "certain" insert --physical--; and line 41, after "lens 54." insert --As shown in Fig. 3, the openings defined by frames 96 and 100 are located in obtusely disposed planes when the four housing sections are in the extended or operative position.--.

Signed and sealed this 20th day of February 1973.

(SEAL)
Attest:

EDWARD M. FLETCHER, JR.           ROBERT GOTTSCHALK
Attesting Officer                 Commissioner of Patents